US005290821A

United States Patent [19]

Sakurai et al.

[11] Patent Number: 5,290,821

[45] Date of Patent: Mar. 1, 1994

[54] ELECTRO-RESPONSIVE ELASTOMERIC MATERIAL

[75] Inventors: Ryo Sakurai, Kodaira; Yasuo Kurachi, Tokyo; Yoshiki Fukuyama; Takayuki Maruyama, both of Kodaira; Tasuku Saito, Tokorozawa, all of Japan

[73] Assignee: Bridgestone Corporation, Tokyo, Japan

[21] Appl. No.: 967,734

[22] Filed: Oct. 28, 1992

[30] Foreign Application Priority Data

Oct. 28, 1991 [JP] Japan ................................ 3-308437

[51] Int. Cl.[5] ............................................ C08K 13/02

[52] U.S. Cl. ....................................... 521/82; 521/98; 523/215; 523/217; 523/223; 524/65; 524/79; 524/424; 524/445; 524/493; 524/71; 524/405; 524/430; 524/431; 524/432; 524/433; 524/437; 524/428; 524/443; 524/588; 524/571

[58] Field of Search ............... 523/215, 217; 524/496, 524/65, 79, 424, 445, 493; 252/511, 516; 521/82, 98

[56] References Cited

U.S. PATENT DOCUMENTS 4,362,569 12/1982 Martin ................................ 106/307
4,598,105 7/1986 Weber et al. ........................ 523/215
4,684,481 8/1987 Jackson et al. .................... 252/510

FOREIGN PATENT DOCUMENTS 59-30887 2/1984 Japan .
3-91541 4/1991 Japan .

*Primary Examiner*—Bernard Lipman
*Assistant Examiner*—Mark Nagumo
*Attorney, Agent, or Firm*—Oblon, Spivak, McClelland, Maier & Neustadt

[57] ABSTRACT

An electro-responsive elastomeric material comprising (A) an electrically insulating polymer having a specific modulus of elasticity and (B) a fine powder dispersed in the polymer which electrically polarizes under an electric field independent of water changes its viscoelasticity upon voltage application. The powder has a mean particle size of 0.5 to 500 μm and is (1) a fine carbonaceous powder having a C/H atomic ratio of from 1.2 to 5, (2) composite particles having minute particulates of an insulating material dispersed in a matrix phase of a carbonaceous or carbide material, (3) composite particles having minute particulates of a carbonaceous or carbide material dispersed in a matrix phase of an insulating material, or (4) a fine composite powder of a stratum clay mineral having a two-dimensional stratum structure with a carbonaceous or carbide material incorporated between the strata.

16 Claims, No Drawings

ELECTRO-RESPONSIVE ELASTOMERIC MATERIAL

FIELD OF THE INVENTION

This invention relates to an electro-responsive elastomeric material whose visco-elasticity varies with an electric filed applied thereto, and more particularly, to such an electro-responsive elastomeric material which will find use as general industrial parts and automotive parts for energy absorption and vibration damping purposes, for example, dampers, shock absorbers and engine mounts.

BACKGROUND OF THE INVENTION

In the prior art, research has been effected on vibration damping rubbers and dampers having electrorheological fluid sealed therein with a view toward developing practically acceptable devices having the excellent function of adjusting spring or loss properties by changing the applied electric field in response to an input. In order that vibration damping rubbers and dampers utilizing electrorheological fluid perform in practice, it is necessary to completely seal the electro-rheological fluid in a container and to develop a fully stable electrorheological fluid in which dispersed fine particles do not settle or coalesce over a long period of time. Because of the differential specific gravity between an insulating oil as the medium and the dispersed fine particles, none of the prior art electro-rheological fluids could meet these requirements.

One known material whose viscoelasticity varies with an electric field applied thereto is a field effect flexible polymer gel. This polymer gel finds a limited application since it can operate only in a special solvent.

Also, a material whose modulus of elasticity varies with an electric field was recently reported by Japanese Patent Application Kokai (JP-A) No. 91541/1991. This variable modulus material is comprised of an electrically insulating polymeric material having dispersed therein a fine powder which will electrically polarize in an electric field. The dispersed fine powder used in this material is hydrophilic fine particles which will polarize in the presence of water, conductive polymer fine particles, or fine particles which do not undergo sufficient electric polarization in an electric field. Thus, some variable modulus materials are difficult to adjust the water content during manufacture and lack the stability of their quality due to their increased temperature dependency. Some allow excessive current flow upon application of an electric field. And some fail to provide a satisfactory change of modulus of elasticity. For these reasons and other, the variable modulus materials are also limited in use.

SUMMARY OF THE INVENTION

Therefore, an object of the present invention is to provide an electro-responsive elastomeric material which is free of a high fluidity liquid medium like the oil for the electrorheological fluid or the solvent for the electric field flexible polymer gel. Another object of the present invention is to provide an electro-responsive elastomeric material which includes an electrically insulating polymer having dispersed therein a fine powder which electrically polarizes in an electric field independent of water. A further object of the present invention is to provide an electro-responsive elastomeric material whose visco-elasticity largely varies upon application of an electric field and which is acceptably stable in practice.

According to the present invention, there is provided an electro-responsive elastomeric material comprising (A) an electrically insulating polymer having a modulus of elasticity of $10^5$ to $10^9$ dyne/cm$^2$, and (B) a fine powder dispersed in said polymer, which will electrically polarize under an electric field independent of water. Fine powder (B) has a mean particle size of 0.5 to 500 μm and is selected from the group consisting of (1) a fine carbonaceous powder having a carbon-to-hydrogen atomic ratio of from 1.2 to 5, (2) minute particulate dispersion type composite particles having minute particulates of an insulating material dispersed in a matrix phase of a carbonaceous or carbide material, (3) minute particulate dispersion type composite particles having minute particulates of a carbonaceous or carbide material dispersed in a matrix phase of an insulating material, and (4) a fine composite powder of a stratum clay mineral having a two dimensional stratum structure with a carbonaceous or carbide material incorporated between the strata. This material is a functional material in which viscoelasticity largely varies upon application of an electric field.

DETAILED DESCRIPTION OF THE INVENTION

The present invention is directed to an electro-responsive elastomeric material wherein (B) a fine powder which will electrically polarize under an electric field independent of water is dispersed in (A) an electrically insulating polymer.

Electrically insulating polymer (A) used herein is desirably a fully flexible polymer which exhibits elastic behavior through physical or chemical crosslinking at room temperature or service temperature. It has a modulus of elasticity of $10^5$ to $10^9$ dyne/cm$^2$, preferably $10^6$ to $10^8$ dyne/cm$^2$. Examples include crosslinked rubbers having an unsaturated carbon-to-carbon bond in their backbone, such as butadiene rubber, isoprene rubber and styrene-butadiene rubber; inorganic crosslinked rubbers such as silicone rubber and phosphazene rubber; and various thermoplastic rubber such as polyurethane. Also included are crosslinked rubbers having softeners and other additives blended in the foregoing rubbers as well as such crosslinked rubbers which have been expanded or foamed.

Fine powder (B) is generally selected from the following types (1) to (4).

(1) Fine carbonaceous powder has a carbon-to-hydrogen (C/H) atomic ratio of from 1.2 to 5. Included in this type are (1-1) coal tar pitch, petroleum pitch and pitch resulting from pyrolysis of polyvinyl chloride, all in finely divided form; (1-2) carbonaceous mesophase microspherical powders obtained by heat treating such pitch or tar components, for example, a powder which is obtained by heat treating such pitch or tar components to form optically anisotropic microspheres and dissolving the spheres in a solvent for fractionating of the pitch component and optionally, further finely pulverizing the powder, or a powder obtained by heat treating a pitch material to form a bulk meso-phase (see JP-A 30887/1984) followed by fine pulverization, or a powder obtained by finely pulverizing partially crystallized pitch; (1-3) low temperature treated carbonaceous powders which are obtained by carbonizing thermosetting resins such as phenolic resins at relatively low temperatures; (1-4) fine powders obtained by finely dividing coal species such as anthracite and bituminous coal or heat treated ones thereof; (1-5) carbon spheres obtained by heating under pressure mixtures of a hydrocarbon base vinyl polymer such as polyethylene and polystyrene and a chlorinated polymer such as vinyl chloride and vinylidene chloride or fragments of crashed carbon spheres; and (1-6) carbonized ones of polymers such as polyacrylonitrile having a high percentage carbon retention.

(2a) Minute particulate dispersing composite particles each have minute particulates of an insulating material dispersed in a matrix phase of a carbonaceous or carbide material. By impregnating organic particles having a high percentage carbon retention with insulating materials such as metal compounds followed by carbonization, there are obtained minute particulate non-uniform dispersion type composite particles in each of which more particulates are distributed in proximity to the surface of the matrix phase and less particulates distributed in proximity of the center thereof. Alternatively, by coating cores of a compound forming an oxide at elevated temperatures with an organic resin having a high percentage carbon retention such as phenolic resin and carbonizing the particles, there are obtained minute particulate non-uniform dispersion type composite particles in each of which less particulates are distributed in proximity to the surface of the matrix phase and more particulates distributed in proximity of the center thereof. Preferably in these minute particulate dispersion type composite particles, the matrix phase has an electric conductivity of $10^{-10}$ to $10^2$ S/cm, while the dispersed particulates are of at least one material selected from semiconductors and insulating materials and have an electric conductivity which is up to 1/10 of the electric conductivity of the matrix phase.

(2b) Also by mixing organic particles having a high percentage carbon retention and insulating materials such as metal compounds followed by carbonization, there are obtained composite particles in which minute particulates are uniformly dispersed. Preferably in these minute particulate dispersing composite particles, the matrix phase has an electric conductivity of $10^{-10}$ to $10^2$ S/cm, while the dispersed particulates are of at least one material selected from semiconductors and insulating materials and have an electric conductivity which is up to 1/10 of the electric conductivity of the matrix phase.

(3) Minute particulate dispersing composite particles each have minute particulates of a carbonaceous or carbide material dispersed in a matrix phase of an insulating material. By mixing organic particles having a high percentage carbon retention and insulating materials such as metal compounds followed by carbonization, there are obtained composite particles in which minute particulates are dispersed. Preferably in these minute particulate dispersion type composite particles, the matrix phase is of at least one material selected from semiconductors and insulating materials while the dispersed particulates have an electric conductivity of $10^{-10}$ to $10^2$ S/cm which is at least 10 times the electric conductivity of the matrix phase.

(4) A fine composite powder is in the form of a stratum clay mineral having a two dimensional stratum structure with a carbonaceous or carbide material incorporated between the strata. It is prepared, for example, by incorporating an organic compound having a high percentage carbon retention between strata of a material having a two dimensional stratum structure such as stratum aluminosilicate and polysilicate followed by carbonization.

The powders of types B-(2a), (2b) and (3) are described in further detail. In type B-(2a), that is, minute particulate dispersing non-uniform composite particles in which the fine particulates have a lower electric conductivity than the matrix, the matrix phase has a moderate conductivity, preferably in the range of from $10^{-10}$ to $10^2$ S/cm, more preferably from $10^{-10}$ to $10^0$ S/cm. The material of which the matrix phase has a conductivity within the specific range and examples include carbonaceous materials, carbides such as boron carbide and aluminum carbide, and organic semiconductor materials such as polyaniline and poly(acenequinone). Preferred are carbonaceous materials often having a carbon content of 80 to 99.9% by weight, especially 90 to 99% by weight, the balance being usually hydrogen, oxygen and nitrogen atoms.

Dispersed in the matrix phase are minute particulates formed of a material which is selected from semiconductors and insulating materials and should have a lower conductivity than the matrix phase. Namely, the conductivity of the dispersed phase is up to 1/10 of that of the matrix phase, preferably from 1/10 to $1/10^{14}$, especially from $1/10^3$ to $1/10^{14}$ of that of the matrix phase. Those composite particles in which the conductivity of the dispersed phase is higher than 1/10 of the conductivity of the matrix phase are not satisfactory. At the same time as meeting this requirement, the minute particulates or dispersed phase should preferably have a low conductivity of up to $10^{-2}$ S/cm, more preferably up to $10^{-6}$ S/cm.

The material of which minute particulates are formed is generally selected from insulating and semiconductor materials, for example, oxides such as alumina, silica, boron oxide, titania, calcium oxide, iron oxide, tin oxide, and zinc oxide, and non-oxides such as silicon carbide, silicon nitride, and aluminum nitride. Preferred are silica, alumina and titania.

Preferably, the minute particulates have a size of from about 1 nm to about 1 μm, more preferably from about 2 nm to about 0.5 μm. The total amount of minute particulates dispersed ranges from 0.01 to 40% by weight, preferably from 0.1 to 30% by weight based on the weight of each composite particle. Less than 0.01% would be ineffective for the purpose of the invention whereas more than 40% can sometimes interfere with the preparation of composite particles. When the composite particles are graded such that the minute particulates are dispersed more on the surface side and less on the center side, preferably the quantity of minute particulates dispersed is 0.1 to 99%, especially 1 to 95% by weight on the surface side, and 0 to 30%, especially 0 to 25% by weight near the center side provided that the dispersed quantity on the surface side is at least 1.5 times, especially at least 3 times that on the center side. These dispersed quantities may be interchanged when it is desired that the composite particles are graded such that the minute particulates are dispersed less on the surface side and more on the center side.

The composite particles of the non-uniform dispersion type in which minute particulates having a lower conductivity are distributed more on a surface side and less on a center side of a matrix phase may be prepared by any desired methods, for example, methods (A) to (D) as given below.

(A) Composite particles are prepared by starting with organic particles of a thermosetting resin such as phenol resin, furan resin, polydimethylsilane resin, melamine resin, and epoxy resin or a thermoplastic resin such as polyacrylonitrile, which has been treated with radiation or rendered infusible, impregnating the organic particles with a compound, for example, a metal alkoxide (e.g., ethyl silicate, aluminum isopropoxide, and titanium isopropoxide), an organometallic complex (e.g., ferrocene), and an ester of an organic compound with an inorganic acid (e.g., a borate ester synthesized from diethanol amine and boric acid), and heat treating the impregnated particles, followed by carbonization.

(B) Composite particles are prepared by starting with organic particles having a high percentage carbon retention, for example, of a phenol resin, furan resin or polydimethylsilane resin, applying a compound such as a metal alkoxide, an organometallic complex, and an ester of an organic compound and an inorganic acid to the surface of the organic particles, further coating the particles with a liquid organic compound having a high carbon retention, and heat treating the coated particles for carbonization.

(C) Composite particles are prepared by starting with organic particles having a high percentage carbon retention, for example, of a phenol resin, furan resin or polydimethylsilane resin, applying a mixture of a compound such as a metal alkoxide, an organometallic complex, and an ester of an organic compound and an inorganic acid and a liquid organic compound having a high carbon retention to the surface of the organic particles, and heat treating the coated particles for carbonization.

(D) Composite particles are prepared by heat treating organic particles having a high percentage carbon retention, for example, of a phenol resin, furan resin or polydimethylsilane resin, applying a compound capable of forming minute particulates having a desired conductivity to the surface of the particles by such a technique as chemical vapor deposition (CVD), and heat treating the coated particles for carbonization.

The composite particles of the non-uniform dispersion type in which minute particulates having a lower conductivity are distributed less on a surface side and more on a center side of a matrix phase may be prepared by method (E) given below.

(E) Composite particles are prepared by furnishing cores of a compound which has a low solubility in water at low temperatures, but a high solubility at elevated temperatures and is capable of forming an oxide at elevated temperatures, and coating the cores with a phenolic resin. The resin coated cores are impregnated with water as by dipping in hot water and thereafter, carbonized.

More particularly, a resol type phenolic resin is granulated and cured in water containing boric acid and preferably a surface active agent as a dispersant, thereby forming spherical phenolic resin particles having a boric acid core. The particles are dipped in hot water for 24 hours, taken out of the water, and dried. Thereafter, the particles are carbonized in a non-oxidizing atmosphere. There are obtained particles of the non-uniform dispersion type in which carbonaceous material having moderate conductivity forms a matrix phase and minute particulates of boron oxide having low conductivity are distributed in the matrix densely on a center side and sparsely on a surface side.

In type B-(2b), that is, minute particulate uniform dispersion type composite particles in which the fine particulates have a lower electric conductivity than the matrix, the matrix phase has a moderate conductivity, preferably in the range of from $10^{-10}$ to $10^{2}$ S/cm, more preferably from $10^{-10}$ to $10^{0}$ S/cm. The material of which the matrix phase is formed has a conductivity within the specific range and examples include carbonaceous materials, carbides such as boron carbide and aluminum carbide, and organic semiconductor materials such as polyaniline and poly(acene-quinone). Preferred are carbonaceous materials often having a carbon content of 80 to 99.9% by weight, especially 90 to 99% by weight, the balance being usually hydrogen, oxygen and nitrogen atoms.

Dispersed in the matrix phase are minute particulates formed of a material which is selected from semiconductors and insulating materials and should have a lower conductivity than the matrix phase. Namely, the conductivity of the dispersed phase is up to 1/10 of that of the matrix phase, preferably from 1/10 to $1/10^{14}$, especially from $1/10^{3}$ to $1/10^{14}$ of that of the phase. Those composite particles in which the conductivity of the dispersed phase is higher than 1/10 of the conductivity of the matrix phase are not satisfactory. At the same time as meeting this requirement, the minute particulates or dispersed phase should preferably have a low conductivity of up to $10^{-2}$ S/cm, more preferably up to $10^{-6}$ S/cm.

The material of which minute particulates are formed is generally selected from insulating and semiconductor materials, for example, oxides such as alumina, silica, boron oxide, titania, calcium oxide, iron oxide, tin oxide, and zinc oxide, and non-oxides such as silicon carbide, silicon nitride, and aluminum nitride. Where the matrix phase is of a carbonaceous material, another carbonaceous material having a lower conductivity may be used to form fine particulates. Preferred are silica, alumina and titania.

Preferably, the minute particulates have a size of from about 1 nm to about 1 μm, more preferably from about 2 nm to about 0.5 μm. The total amount of minute particulates dispersed ranges from 0.1 to 70% by weight, preferably from 1 to 60% by weight based on the weight of each composite particles. Less than 0.1% of minute particulates would fail to provide the composite particles with a controlled conductivity, but with a conductivity substantially equal to the moderate conductivity of the matrix phase. Composite particles containing more than 70% of minute particulates would probably have electrical properties similar to those of the low conductivity minute particulates.

The composite particles of uniform dispersion type may be prepared by any desired methods, for example, by mixing a starting compound corresponding to the matrix phase having a moderate conductivity (to be referred to as matrix-forming compound) with another starting compound corresponding to the minute particulates having a low conductivity (to be referred to as particulate-forming compound), and granulating the mixture by spray drying or the like; solidifying the mixture through curing reaction or the like and granulating in a ball mill or the like; further heat treating similarly granulated particles at elevated temperatures; and heat treating the mixture prior to granulation. The desired powder may be prepared by a proper choice of the combination of starting compounds and the process including a mixing method, granulating method, and heat treatment (including heat treating means and atmosphere). Depending on the form, thermal and other physical properties of the starting compounds, special procedures (F) to (H) may be employed although the invention is not limited thereto.

(F) The minute particulates are included in the matrix-forming compound directly if it is initially available in liquid or solution form or after it is liquefied, and the liquid material is gelled or hardened by a suitable technique and then heat treated. The minute particulates should be solid during the process.

(G) If both the matrix- and minute particulate-forming compounds are initially available in liquid or solution form, composite particles are prepared by mixing them. The minute particulate-forming compound should be a material capable of gelling or precipitating faster than the matrix-forming compound. The two compounds are mixed in a selected ratio, gelled or hardened, granulated and then heat treated.

(H) If both the matrix- and minute particulate-forming compounds are initially available in solid form, the matrix-forming compound should have fluidity during the powder preparing process and the minute particulate-forming compound should remain solid throughout the process. The two compounds are mixed and optionally heat treated before the mixture is granulated.

The powder of the invention can be prepared by procedures (F) to (H). For a particular combination of starting compounds, it is desired to further heat treat the resulting powder at elevated temperatures because the conductivity of the powder can be changed by controlling the heat treating temperature and atmosphere. For the control of the heat treating atmosphere, for example, an inert gas atmosphere is most often used when it is desired to retain more carbide in the composite particles after heat treatment. An atmosphere of $NH_3$ or $N_2$ gas may be selected particularly when it is desired to generate nitride in the interior of composite particles.

The matrix-forming compound may be selected from organic compounds having a high carbon retention, for example, phenol resins, furan resins, polydimethylsilane resins, and mixtures thereof. The particulate-forming compound may be selected from metal alkoxide (e.g., ethyl silicate, aluminum isopropoxide, and titanium isopropoxide), organometallic complexes (e.g., ferrocene), esters of organic compounds with inorganic acids (e.g., a borate ester synthesized from diethanol amine and boric acid), and insulating and semiconductor materials such as silica, alumina and titania, and mixtures thereof. It is to be noted that the powder of the invention can also be prepared from a combination of an organic compound having a high carbon retention with an organic compound having a higher conductivity after carbonization such as tar and pitch, because there are formed composite particles in which the former compound forms minute particulates and the latter compound forms the matrix phase.

In type B-(3), that is, minute particulate dispersion type composite particles in which minute particles have a higher electric conductivity than the matrix, the distribution of minute particulates in the matrix phase may be either uniform or non-uniform. More particularly, the composite particles may be either composite particles of the uniform dispersion type in which minute particulates are uniformly dispersed in a matrix phase, or composite particles of non-uniform dispersion type in which minute particulates are non-uniformly dispersed in a matrix phase such that the minute particulates are dense near the surface and sparse near the center of the particle, or inversely, the minute particulates are sparse near the surface and dense near the center of the particle.

The matrix phase is formed of a material having a low conductivity. More particularly, the matrix phase has a low electrical conductivity of preferably up to $10^{-2}$ S/cm, more preferably up to $10^{-6}$ S/cm. The material of which the matrix phase is formed is generally selected from insulating and semiconductor materials, for example, oxides such as alumina, silica, boron oxide, titania, calcium oxide, iron oxide, tin oxide, and zinc oxide, and non-oxides such as silicon carbide, silicon nitride, and aluminum nitride. Preferred are silica, alumina and titania.

In turn, the minute particulates dispersed in the matrix phase should have a higher conductivity than that of the matrix phase. Namely, the conductivity of the dispersed phase is at least 10 times that of the matrix phase, preferably from 10 to $10^{14}$ times, especially from $10^3$ to $10^{14}$ times that of the matrix phase. Composite particles in which the conductivity of the dispersed phase is less than 10 times that of the matrix phase are not satisfactory. At the same time as meeting this requirement, the minute particulates or dispersed phase should have a moderate conductivity of $10^{-10}$ to $10^2$ S/cm, preferably $10^{-10}$ to $10^0$ S/cm.

The material of which minute particulates are formed has a conductivity within the specific range and examples include carbonaceous materials and carbides such as boron carbide and aluminum carbide. Preferred are carbonaceous materials often having a carbon content of 80 to 99.9% by weight, especially 90 to 99% by weight, the balance being usually hydrogen, oxygen and nitrogen atoms. Where these carbonaceous materials are used to form minute particulates, another carbonaceous material having a lower conductivity may be used as the matrix phase.

Preferably, the minutes particulates have a size of from about 1 nm to about 1 $\mu$m, more preferably from about 2 nm to about 0.5 $\mu$m. The total amount of minute particulates dispersed ranges from 15 to 99.5% by weight, preferably from 30 to 90% by weight based on the weight of each composite particle. Less than 15% of minute particulates would fail to provide the composite particles with a controlled conductivity, but with a conductivity approximately equal to the low conductivity of the matrix phase. Composite particles containing more than 99.5% of minute particulates would have electrical properties similar to those of the moderate conductivity minute particulates.

Where the composite particles are graded such that the minute particulates are dispersed more on the surface side and less on the center side, preferably the quantity of minute particulates dispersed is 0.1 to 99%, especially 1 to 95% by weight on the surface side, and 0 to 30%, especially 0 to 25% by weight near the center side provided that the dispersed quantity on the surface side is at least 1.5 times, especially at least 3 times that on the center side. These dispersed quantities may be interchanged when it is desired that the composite particles are graded such that the minute particles are dispersed less on the surface side and more on the center side.

The composite particles of type B-(3) may be prepared by any desired methods, for example, by mixing a starting compound corresponding to the matrix phase having a low conductivity (to be referred to as matrix-forming compound) with another starting compound corresponding to the minute particulates having a moderate conductivity (to be referred as particulate-forming compound), and granulating the mixture by spray drying or the like; solidifying the mixture through curing reaction or the like and granulating in a ball mill or the like; further heat treating similarly granulated particles at elevated temperatures; and heat treating the mixture prior to granulation. The desired powder may be prepared by a proper choice of the combination of starting compounds and the process including a mixing method, granulating method, and heat treatment (including heat treating means and atmosphere). Depending on the form, thermal and other physical properties of the starting compounds, special procedures (I) to (K) may be employed although the invention is not limited thereto.

(I) The minute particulates are included in the matrix-forming compound directly if it is initially available in liquid or solution form or after it is liquefied, and the liquid material is gelled or hardened by a suitable technique and then heat treated. The minute particulates should be solid during the process.

(J) If both the matrix- and minute particulate-forming compounds are initially available in liquid or solution form, composite particles are prepared by mixing them. The minute particulate-forming compound should be a material capable of gelling or precipitating faster than the matrix-forming compound. The two compounds are mixed in a selected ration, gelled or hardened, granulated and then heat treated.

(K) If both the matrix- and minute particulate-forming compounds are initially available in solid form, the matrix-forming compound should have fluidity during the powder preparing process and the minute particulate-forming compound should remain solid throughout the process. The two compounds are mixed and optionally heat treated before the mixture is granulated.

The powder of the invention can be prepared by procedures (I) to (K). For a particular combination of starting compounds, it is desired to further heat treat the resulting powder at elevated temperatures because the conductivity of the powder can be changed by controlling the heat treating temperature and atmosphere. For the control of the heat treating atmosphere, for example, an inert gas atmosphere is most often used when it is desired to retain more carbide in the composite particles after heat treatment. An atmosphere of $NH_3$ or $N_2$ gas may be selected particularly when it is desired to generate nitride in the interior of composite particles.

The matrix-forming compound may be at least one liquid or soluble compound selected from metal alkoxides (e.g., ethyl silicate, aluminum isopropoxide, and titanium isopropoxide), organometallic complexes (e.g., ferrocene), and esters of organic compounds with inorganic acids (e.g., a borate ester synthesized from diethanol amine and boric acid). The particulate-forming compound may be selected from organic compounds having a high carbon retention, for example, phenol resins, furan resins, polydimethylsilane resins, and mixtures thereof. It is to be noted that the powder of the invention can also be prepared from a combination of an organic compound having a high carbon retention with a compound having a higher conductivity, for example, carbides such as boron carbide and aluminum carbide, organic semiconductor materials such as polyaniline and poly(acene-quinone), and organic compounds such as tar and pitch, because there are formed composite particles in which the former compound forms the matrix phase and the latter compound forms the minute particulates.

Using any one or more of the above-mentioned fine powders, electro-responsive elastomeric materials can be prepared. Although the electric conductivity of the fine powder is not particularly limited, it preferably ranges from $10^{-13}$ to $10^{2}$ S/cm, more preferably from $10^{-12}$ to $10^{-2}$ S/cm as measured in a compact form.

The fine powder consists of particles having a means particle size of 0.5 to 500 $\mu$m, preferably 1 to 200 $\mu$m. Particles having a mean particle size in excess of 500 $\mu$m are difficult to uniformly disperse in a medium whereas particles having a mean particle size of less than 0.5 $\mu$m offer a reduced change of viscoelasticity upon application of an electric field.

In the practice of the invention, 100 parts by weight of electrically insulating polymer is preferably blended with 20 to 300 parts, more preferably 30 to 200 parts by weight of fine powder to be dispersed. On this basis, less than 20 parts of dispersed fine particles would offer a reduced change of viscoelasticity upon application of an electric field whereas it would be difficult to disperse more than 300 parts of fine particles.

The thus obtained electro-responsive elastomeric materials experience a substantial change of viscoelastic properties such as dynamic elastic modulus and loss tangent (tan $\delta$) upon application of an electric field and exert such an effect over a wide temperature range. They are stable and thus very useful in practice.

In general, a vibration system including a vibration damping device, when it receives an input corresponding to its natural frequency, rather undergoes substantial vibration due to resonance. Therefore, one important factor in the design of a vibration damping device is to reduce the resonance. This problem can be readily overcome by using a material which substantially changes its viscoelastic properties upon voltage application according to the present invention. By utilizing a great change of elastic modulus upon voltage application, for example, the natural frequency can be shifted so as to avoid any resonance to the input. Similarly, by utilizing a change of tan $\delta$, the magnitude of resonance can be controlled.

EXAMPLE

Examples of the present invention are given below by way of illustration and not by way of limitation. All parts are by weight.

EXAMPLE 1

An isoprene rubber composition was prepared by blending 30 parts of oil with 100 parts of a polymer. Separately, by impregnating phenolic resin particles with ethyl silicate, followed by carbonization, there was furnished a fine powder in the form of composite particles having a mean particle size of 20 $\mu$m wherein silica fines were non-uniformly dispersed such that the fines were more in proximity to the surface and less in proximity to the center of the matrix phase. In 100 parts of the rubber composition was dispersed 150 parts of the fine powder. The dispersion was vulcanized under suitable conditions to produce an electro-responsive elastomeric material having an elastic modulus of $5.0\times10^{6}$ dyne/$cm^2$. The material was measured for a change of its viscoelasticity by using a Model RDS-II viscoelasticity meter (Rheometrix Co.) and applying a voltage of 2 kV/mm. The storage elastic modulus (G') increased 6 times and the loss tangent (tan $\delta$) reduced to 45% as compared with the values measured in the absence of an electric field.

EXAMPLE 2

In 100 parts of an isoprene rubber composition prepared by blending 50 parts of oil with 100 parts of a polymer was dispersed 150 parts of a fine powder having a mean particle size of 170 $\mu$m which was furnished as in Example 1. The dispersion was vulcanized under suitable conditions to produce an electro-responsive elastomeric material having an elastic modulus of $9.0\times10^6$ dyne/cm$^2$. The material was measured for a change of its viscoelasticity as in Example 1 by applying a voltage of 2 kV/mm at room temperature. At maximum, G' increased 4 times and tan $\delta$ reduced to 70%.

EXAMPLE 3

In 100 parts of a two-part reactive silicone rubber (having an elastic modulus of $3.4\times10^6$ dyne/cm$^2$, commercially available as KE 1225 from Shin-Etsu Chemical Co., Ltd.) was dispersed 150 parts of the same fine powder as in Example 1. The dispersion was cured at room temperature to produce an electro-responsive elastomeric material having an elastic modulus of $4.5\times10^6$ dyne/cm$^2$. The material was measured for a change of its viscoelasticity as in Example 1 by applying a voltage of 2 kV/mm at room temperature. At maximum, G' increased 5 times and tan $\delta$ reduced to 50%.

EXAMPLE 4

In 100 parts of a two-part reactive silicone rubber (having an elastic modulus of $3.4\times10^6$ dyne/cm$^2$, KE 1225) was dispersed 120 parts of a fine carbonaceous powder having a mean particle size of 20 $\mu$m which was furnished by heat treating coal tar pitch components, dissolving the material in a solvent for fractionation, followed by heat treatment again. The dispersion was cured at room temperature to produce an electro-responsive elastomeric material having an elastic modulus of $6.8\times10^6$ dyne/cm$^2$. The material was measured for a change of its viscoelasticity as in Example 1 by applying a voltage of 2 kV/mm at room temperature. At maximum, G' increased 3 times.

Comparative Example 1

In 100 parts of an isoprene rubber composition prepared by blending 50 parts of oil with 100 parts of a polymer was dispersed 100 parts of a fine powder which was obtained by finely dividing an ion-exchange resin (commercially available as Diaion from Mitsubishi Chemicals K.K.) in an automatic mortar to a particle size of 100 $\mu$m. The dispersion was cured at room temperature to produce an electro-responsive elastomeric material having an elastic modulus of $4.2\times10^6$ dyne/cm$^2$. The material was measured for a change of its viscoelasticity as in Example 1 by applying a voltage of 2 kV/mm at room temperature, but measurement was impossible due to excess current flow.

Comparative Example 2

In 100 parts of a two-part reactive silicone rubber (having an elastic modulus of $3.4\times10^6$ dyne/cm$^2$, KE 1225) was dispersed 150 parts of a fine barium titanate powder having a mean particle size of 10 $\mu$m (commercially available from Kyoritsu Yogyo K.K.). The dispersion was cured at room temperature to produce an electro-responsive elastomeric material having an elastic modulus of $4.2\times10^6$. The material was measured for a change of its viscoelasticity as in Example 1 by applying a voltage of 2 kV/mm at room temperature. No significant changes of G' and tan $\delta$ were found.

EXAMPLE 5

This exemplifies composite particles of the minute particulate uniform dispersion type.

A fine powder was furnished by dispersing aluminum hydroxide powder in a water-soluble phenolic resin, adding toluenesulfonic acid to the dispersion, and spray drying the mixture, followed by carbonization. The powder consisted of composite particles of the uniform dispersion type having a mean particle size of 10 $\mu$m wherein alumina fines were uniformly dispersed in the matrix phase. The fine powder, 150 parts, was dispersed in 100 parts of an isoprene rubber composition (30 parts oil/100 parts polymer). The dispersion was vulcanized under suitable conditions to produce an electro-responsive elastomeric material having an elastic modulus of $5.6\times10^6$ dyne/cm$^2$. The material was measured for a change of its viscoelasticity as in Example 1 by applying a voltage of 2 kV/mm. At maximum, G' increased 3 times and tan $\delta$ reduced to 70%.

EXAMPLE 6

This exemplifies composite particles wherein dispersed minute particulates have a higher conductivity than the matrix.

A fine powder was furnished by dispersing graphite powder having a mean particle size of 1.2 $\mu$m in a water-soluble phenolic resin, adding toluenesulfonic acid to the dispersion, and spray drying the mixture, followed by carbonization. The powder consisted of composite particles of the dispersion type having a mean particle size of 15.4 $\mu$m wherein graphite fines were dispersed in the matrix phase. The fine powder, 120 parts, was dispersed in 100 parts of an isoprene rubber composition (30 parts oil/100 parts polymer). The dispersion was vulcanized under suitable conditions to produce an electro-responsive elastomeric material having an elastic modulus of $8.6\times10^6$ dyne/cm$^2$. The material was measured for a change of its viscoelasticity as in Example 1 by applying a voltage of 2 kV/mm. At maximum, G' increased 2.4 times and tan $\delta$ reduced to 75%.

EXAMPLE 7

Two-dimensional stratum composite particles were prepared by incorporating a quaternary ammonium salt, cetyltrimethylammonium chloride (manufactured by Tokyo Chemicals K.K.) between strata of montmorillonite stratum clay mineral in powder form (manufactured by Mizusawa Chemical K.K.), dipping the powder in acrylonitrile (Kanto Chemical K.K.) for impregnation, and heat treating the powder for polymerizing the acrylonitrile into polyacrylonitrile between clay mineral strata. The powder was then washed with acetone and vacuum dried at room temperature for 6 hours, yielding a powder in which the quaternary ammonium salt and polyacrylonitrile were present between clay mineral strata. The powder was pre-heated at 200° C. for 30 hours in air, then heated up at a rate of 5° C./min., and heat treated at 500° C. for 1 hour in an argon atmosphere for carbonizing the polyacrylonitrile, obtaining a carbon/stratum clay mineral composite powder having a mean particle size of 9.6 $\mu$m.

The stratum composite particles, 150 parts, were dispersed in 100 parts of a two-part reactive silicone rubber (having an elastic modulus of $3.4 \times 10^6$ dyne/cm$^2$, KE 1225). The dispersion was cured at room temperature to produce an electro-responsive elastomeric material having an elastic modulus of $5.2 \times 10^6$ dyne/cm$^2$. The material was measured for a change of its viscoelasticity as in Example 1 by applying a voltage of 2 kV/mm at room temperature. At maximum, G' increased 2 times and tan $\delta$ reduced to 80%.

There has been described an electro-responsive elastomeric material which undergoes a substantial change of its viscoelasticity upon application of an electric field as never found in the prior art. If the material is embodied as general industrial parts and automotive parts for energy absorption and vibration damping purposes, for example, dampers, shock absorbers and engine mounts, then the properties of these parts can be directly controlled by electrical means, with the additional benefit of a simplified part structure.

Although some preferred embodiments have been described, many modifications and variations may be made thereto in the light of the above teachings. It is therefore to be understood that within the scope of the appended claims, the invention may be practiced otherwise than as specifically described.

We claim:

1. An electro-responsive elastomeric material comprising (A) an electrically insulating polymer having a modulus of elasticity of $10^5$ to $10^9$ dyne/cm$^2$, and (B) a fine powder dispersed in said polymer, which fine powder electrically polarizes under an electric field independent of water and has a mean particle size of 0.5 to 500 $\mu$m, said powder being at least one member selected from the group consisting of (1) a fine carbonaceous powder having a carbon-to-hydrogen atomic ratio of from 1.2 to 5, (2) minute particulate-dispersing composite particles having minute particulates of an insulating material of about 1 nm to about 1 $\mu$m dispersed in a matrix phase of a carbonaceous or carbide material, (3) minute particulate-dispersing composite particles having minute particulates of a carbonaceous or carbide material of about 1 nm to about 1 $\mu$m dispersed in a matrix phase of an insulating material, and (4) a fine composite powder of a stratum clay mineral having a two dimensional stratum structure with a carbonaceous or carbide material incorporated between the strata.

2. An electro-responsive elastomeric material according to claim 1 wherein fine powder (B) is comprised of minute particulate-dispersing non-uniform composite particles in each of which minute particulates of an insulating material are dispersed in a matrix phase of a carbonaceous material such that more particles are distributed in proximity to the surface and less particles distributed in proximity to the center of each particle, or less particles are distributed in proximity to the surface and more particles distributed in proximity to the center of each particle.

3. An electro-responsive elastomeric material according to claim 1 wherein fine powder (B) is comprised of minute particulate-dispersing uniform composite particles in each of which minute particulates of an insulating material are uniformly dispersed in a matrix phase of a carbonaceous material.

4. An electro-responsive elastomeric material according to claim 2 or 3 wherein the fine powder is obtained by mixing organic material particles having a high carbon retention with a metal compound and carbonizing the mixture.

5. An electro-responsive elastomeric material according to claim 2 or 3 wherein said carbonaceous material has a carbon content of 80 to 99.9%.

6. An electro-responsive elastomeric material according to claim 2 or 3 wherein the minute particulates have an electric conductivity which is 1/10 or less of the electric conductivity of the matrix phase.

7. An electro-responsive elastomeric material according to claim 1 wherein fine powder (B) has an electric conductivity of $10^{-13}$ to $10^2$ S/cm.

8. An electro-responsive elastomeric material according to claim 1 wherein fine powder (B) is comprised of (3) minute particulate-dispersing composite particles having minute particulates of a carbonaceous or carbide material dispersed in a matrix phase of an insulating material, the minute particulates having an electric conductivity which is 10 times or more the electric conductivity of the matrix phase.

9. An electro-responsive elastomeric material according to claim 1 wherein insulating polymer (A) is comprised of a crosslinked rubber having an unsaturated carbon-to-carbon bond in its backbone or an inorganic crosslinked rubber.

10. An electro-responsive elastomeric material according to claim 9 wherein said rubber is expanded.

11. An electro-responsive elastomeric material according to claim 1 wherein 20 to 300 parts by weight of fine powder (B) is dispersed in 100 parts by weight of insulating polymer (A).

12. An electro-responsive elastomeric material according to claim 1 wherein the electrically insulating polymer (A) is a silicone rubber.

13. An electro-responsive elastomeric material according to claim 1 wherein the electrically insulating polymer (A) is a silicone rubber and the fine powder (B) (1) is a fine carbonaceous powder having a carbon-to-hydrogen atomic ratio of from 1.2 to 5 and an electric conductivity of $10^{-13}$ to $10^2$ S/cm.

14. An electro-responsive elastomeric material according to claim 1 wherein the fine powder (B) (1) is selected from the group consisting of coal tar pitches, petroleum pitches, pitches resulting from pyrolysis of polyvinyl chloride, carbonaceous mesophase microspherical powders obtained by heat treating said pitches or tar components, low temperature treated carbonaceous powders which are obtained by carbonizing thermosetting resins at low temperatures, fine powders obtained by finely dividing coal species or heat treated ones thereof, carbon spheres obtained by heating under pressure mixtures of a hydrocarbon vinyl polymer and a chlorinated polymer or fragments of crushed carbon spheres, and carbonized polymers having a high percentage carbon retention.

15. An electro-responsive elastomeric material according to claim 1 wherein the fine powder (B) (2) is comprised of an insulating material having a conductivity of up to $10^{-6}$ S/cm and being selected from the group consisting of alumina, silica, boron oxide, titania, calcium oxide, iron oxide, tin oxide, zinc oxide, silicon carbide, silicon nitride, and aluminum nitride, said matrix phase having a conductivity of from $10^{-10}$ to $10^2$ S/cm, and the conductivity of the dispersed phase being from 1/10 to $1.10^{14}$ of the conductivity of the matrix phase.

16. An electro-responsive elastomeric material according to claim 1 wherein the fine powder (B) (3) is comprised of a matrix phase having a conductivity of up to $10^{-6}$ S/cm and being selected from the group consisting of alumina, silica, boron oxide, titania, calcium oxide, iron oxide, tin oxide, zinc oxide, silicon carbide, silicon nitride, and aluminum nitride, said minute particulates having a conductivity of $10^{-10}$ to $10^{2}$ S/cm, and the conductivity of the minute particulates being from 10 to $10^{14}$ times that of the matrix phase.

* * * * *